(12) United States Patent
Otsuki et al.

(10) Patent No.: US 11,566,728 B2
(45) Date of Patent: Jan. 31, 2023

(54) FLEXIBLE PIPE AND TEMPERATURE CONTROL SYSTEM

(71) Applicant: Tokyo Electron Limited, Tokyo (JP)

(72) Inventors: Kohei Otsuki, Miyagi (JP); Akiyoshi Mitsumori, Miyagi (JP); Koji Kamata, Miyagi (JP)

(73) Assignee: TOKYO ELECTRON LIMITED, Tokyo (JP)

(*) Notice: Subject to any disclaimer, the term of this patent is extended or adjusted under 35 U.S.C. 154(b) by 474 days.

(21) Appl. No.: 16/258,764

(22) Filed: Jan. 28, 2019

(65) Prior Publication Data
US 2019/0234534 A1 Aug. 1, 2019

(30) Foreign Application Priority Data
Jan. 29, 2018 (JP) .............................. JP2018-012696

(51) Int. Cl.
| | |
|---|---|
| *F16L 3/16* | (2006.01) |
| *F16L 3/01* | (2006.01) |
| *F16L 27/111* | (2006.01) |
| *F16L 25/01* | (2006.01) |
| *F25B 41/00* | (2021.01) |
| *F16L 7/00* | (2006.01) |

(52) U.S. Cl.
CPC ................. *F16L 3/16* (2013.01); *F16L 3/01* (2013.01); *F16L 25/01* (2013.01); *F16L 27/111* (2013.01); *F25B 41/00* (2013.01); *F16L 7/00* (2013.01)

(58) Field of Classification Search
CPC .. F16L 3/16; F16L 27/111; F16L 25/01; F16L 3/01; F16L 7/00; F16L 11/15; F25B 41/00; G05D 23/185
USPC .......................................................... 285/226
See application file for complete search history.

(56) References Cited

U.S. PATENT DOCUMENTS

| | | | | | |
|---|---|---|---|---|---|
| 2,119,317 | A | * | 5/1938 | Dasher .................. | F25B 49/025 92/43 |
| 3,479,621 | A | * | 11/1969 | Helmut ..................... | H01P 3/13 138/143 |
| 4,977,444 | A | * | 12/1990 | Nakajima ............ | H01L 23/4735 361/689 |
| 5,358,287 | A | * | 10/1994 | Winzen ................ | F01N 13/1811 285/227 |
| 5,806,899 | A | * | 9/1998 | Norikawa ............ | F01N 13/1816 285/299 |

(Continued)

FOREIGN PATENT DOCUMENTS

| | | |
|---|---|---|
| CN | 1534228 A | 10/2004 |
| CN | 1943008 A | 4/2007 |

(Continued)

*Primary Examiner* — Muhammad Ijaz
(74) *Attorney, Agent, or Firm* — Pearne & Gordon LLP (57) ABSTRACT

Energy consumption of a temperature control unit can be reduced. A flexible pipe 13 includes a bellows pipe 130 made of a metal and an inner tube 131. The inner tube 131 is provided at an inner side of the bellows pipe 130, and an inner surface of the inner tube where a fluid flows is smooth. The inner surface of the inner tube 131 where the fluid flows may be smoother than a surface of a braided body. Further, the inner tube 131 may be made of, for example, a conductive material. An inner side of the inner tube 131 where the fluid flows may be coated with a conductive film.

14 Claims, 4 Drawing Sheets

(56) References Cited

U.S. PATENT DOCUMENTS

| | | | |
|---|---|---|---|
| 5,967,193 A * | 10/1999 | Nagai | F01N 13/1816 |
| | | | 138/155 |
| 2004/0191440 A1 | 9/2004 | Funaki et al. | |
| 2014/0037880 A1* | 2/2014 | Siddhamalli | B32B 1/08 |
| | | | 264/174.1 |
| 2014/0261842 A1* | 9/2014 | Kim | F01N 13/08 |
| | | | 138/121 |
| 2016/0138737 A1* | 5/2016 | Hariram | B23P 19/00 |
| | | | 138/121 |
| 2018/0119864 A1* | 5/2018 | Webel | F16L 51/026 |
| 2019/0234534 A1* | 8/2019 | Otsuki | F16L 27/111 |

FOREIGN PATENT DOCUMENTS

| | | |
|---|---|---|
| JP | S58-108682 A | 7/1983 |
| JP | 2010-223360 A | 10/2010 |
| JP | 2013-124748 A | 6/2013 |
| JP | 2017-076781 A | 4/2017 |
| WO | 2005/106928 A1 | 11/2005 |

* cited by examiner

FLEXIBLE PIPE AND TEMPERATURE CONTROL SYSTEM

CROSS-REFERENCE TO RELATED APPLICATION

This application claims the benefit of Japanese Patent Application No. 2018-012696 filed on Jan. 29, 2018, the entire disclosure of which is incorporated herein by reference.

TECHNICAL FIELD

The various aspects and embodiments described herein pertain generally to a flexible pipe and a temperature control system.

BACKGROUND

There is known a system configured to control an internal temperature of a processing apparatus, configured to perform a preset processing, by circulating a temperature-controlled fluid into the processing apparatus from a temperature control unit provided at an outside of the processing apparatus. To place the processing apparatus and the temperature control unit efficiently in a limited installation place such as a clean room, it is desirable that the processing apparatus and the temperature control unit have high degree of freedom in their placement. For the purpose, a flexible pipe which can be bent and stretched in a relatively easy manner is used as a part of a pipeline through which the fluid is circulated between these two apparatuses. A metal bellows pipe may be used as the flexible pipe.

Since, however, there exist irregularities at an inner side of the bellows pipe in a flow direction of the fluid, minute vibrations may be generated at the bellow pipe as the fluid flows within the bellows pipe. Thus, when this bellows pipe is used in an apparatus which is required to perform an accurate processing or measurement, accuracy of the processing or measurement performed by the apparatus may be deteriorated due to the vibrations generated from the bellows pipe.

To avoid this problem, there is known a flexible tube equipped with a vibration suppressing structure. In this structure, a pipe-shaped braided body is placed at the inner side of the bellows pipe and the fluid is allowed to flow within the braided body (see, for example, Patent Document 1).

Patent Document 1: Japanese Patent Laid-open Publication No. 2013-124748

If, however, friction between the pipe and the fluid flowing therein is increased, a pressure loss of the fluid is increased. For this reason, to circulate the fluid at a sufficient flow rate within the processing apparatus, a pump of the temperature control unit needs to allow the fluid to be flown at a discharge pressure which is set in consideration of the pressure loss. As a result, however, energy consumption of the temperature control unit is increased. Further, if the processing apparatus and the temperature control unit are placed at separate places while being distanced apart from each other or if the temperature control unit is provided on a floor different from a floor on which the processing apparatus is provided, the energy consumption is further increased.

SUMMARY

In one exemplary embodiment, a flexible pipe includes a bellows pipe made of a metal and a flexible tube. The flexible tube is provided at an inner side of the bellows pipe, and an inner surface of the flexible tube where a fluid flows is smooth.

According to the exemplary embodiment, energy consumption of a temperature control unit can be reduced.

The foregoing summary is illustrative only and is not intended to be any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current exemplary embodiment. Still, the exemplary embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Hereinafter, exemplary embodiments of a flexible pipe and a temperature control system according to the present disclosure will be described in detail with reference to the accompanying drawings. Here, however, it should be noted that the exemplary embodiments are not limiting the flexible pipe and the temperature control system of the present disclosure.

First Exemplary Embodiment

[Configuration of Processing System 100]

Figure 1:
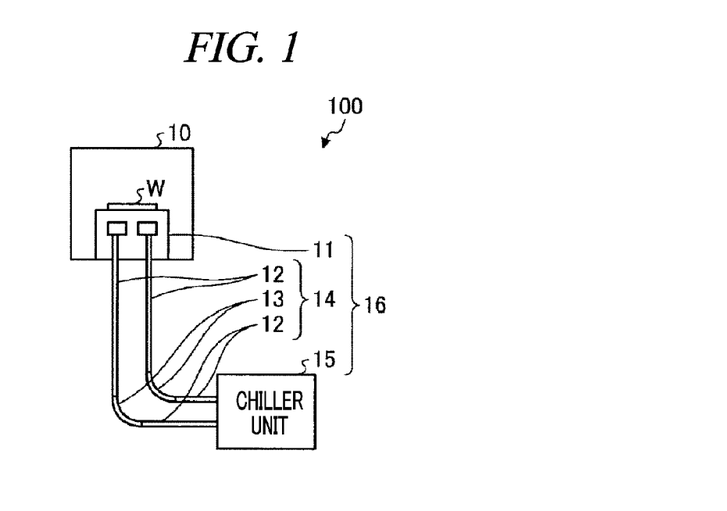
FIG. 1 is a diagram schematically illustrating an example of a processing system.

FIG. 1 is a diagram schematically illustrating an example of a processing system 100. The processing system 100 includes a hermetically sealed processing chamber 10 and a temperature control system 16. The temperature control system 16 is equipped with a stage 11, pipes 14 and a chiller unit 15. The chiller unit 15 is an example of a temperature control unit.

The stage 11 is provided in a space within the processing chamber 10, and a semiconductor wafer W as an example of a temperature control target object is placed on the stage 11. Formed within the stage 11 is a path through which a coolant as a fluid is flown. A coolant a temperature of which is controlled by the chiller unit 15 is supplied into and circulated through the path within the stage 11 via the pipes 14. With this configuration, the semiconductor wafer W placed on the stage 11 is regulated to have a preset temperature. The stage 11 is an example of a heat exchange member. The chiller unit 15 is an example of a supply device configured to supply a temperature-controlled fluid.

The pipes 14 include rigid pipes 12 and flexible pipes 13. In the example of FIG. 1, each pipe 14 includes two rigid pipes 12 and one flexible pipe 13. However, the numbers of the rigid pipes 12 and the flexible pipes 13 belonging to each pipe 14 are not limited thereto.

The processing chamber 10 is connected to, for example, a gas supply device, a gas exhaust device, a high frequency power supply device, and so forth (all of which are not illustrated). A processing gas is supplied into the space within the processing chamber 10 by the gas supply device, and an internal pressure of the space within the processing chamber 10 is adjusted to a predetermined pressure by the gas exhaust device. A high frequency power having a preset frequency and a preset power level is applied from the high frequency power supply device to, for example, the stage 11. Accordingly, plasma is generated in the space within the processing chamber 10, and a preset processing such as etching is performed on the semiconductor wafer W placed on the stage 11 by active species and the like included in the plasma.

[Structure of Flexible Pipe 13]

Figure 2:
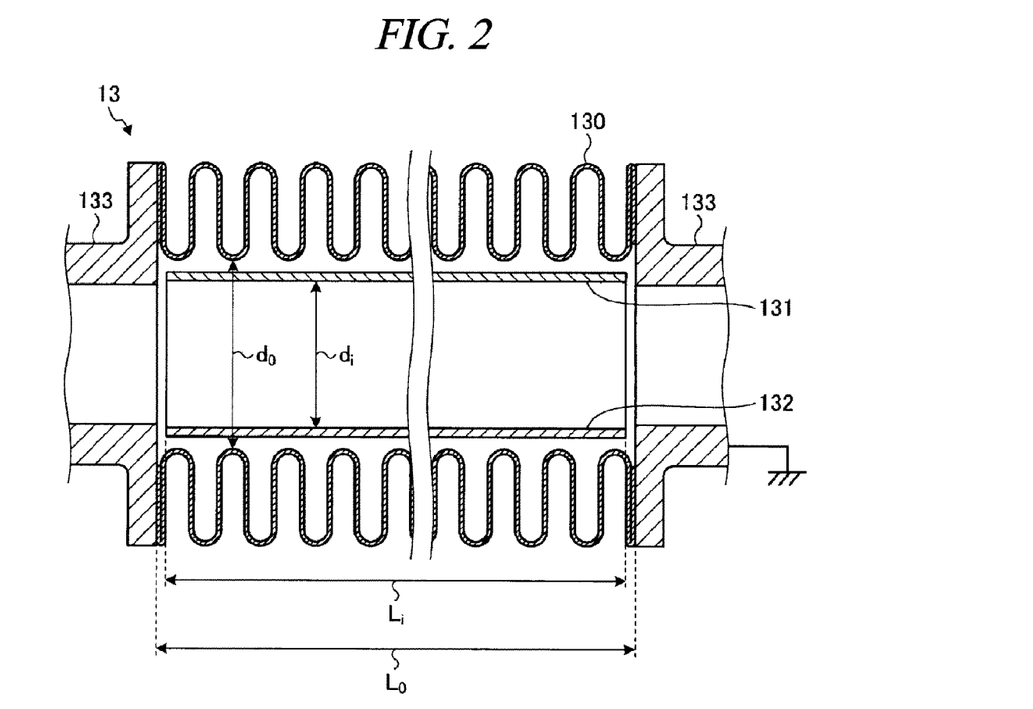
FIG. 2 is a cross sectional view illustrating an example of a flexible pipe according to a first exemplary embodiment.

FIG. 2 is a cross sectional view illustrating an example of the flexible pipe 13 according to the first exemplary embodiment. The flexible pipe 13 in the present exemplary embodiment includes, as depicted in FIG. 2, a bellows pipe 130, an inner tube 131 and caps 133.

The bellows pipe 130 is made of a metal such as, but not limited to, stainless steel, and the fluid flows within the bellows pipe 130. The fluid flowing in the bellows pipe 130 includes an insulating fluid such as Freon. The caps 133 made of a metal such as, but not limited to, stainless steel and having a substantially cylindrical shape are respectively fixed at both ends of the bellows pipe 130 by, for example, welding. The bellows pipe 130 is grounded via the caps 133. An inner diameter of the bellows pipe 130 is defined as $d_0$.

Provided within the bellows pipe 130 is the inner tube 131 having a cylindrical shape and made of a fluorine-based resin such as PFA (tetrafluoroethylene perfluoroalkyl vinylether copolymer) or PTFE (polytetrafluoroethylene). The fluid is allowed to flow within this inner tube 131. Since the inner tube 131 is made of the fluorine-based resin, the inner tube 131 is also bent to conform to the bellows pipe 130 if the bellows pipe 130 is bent. The inner tube 131 is an example of a flexible tube. An inner diameter of the inner tube 131 is denoted by $d_i$.

On a cross section in a direction intersecting with a flow direction of the fluid within the inner tube 131 (that is, in a direction intersecting with a lengthwise direction of the inner tube 131), an outer diameter of the inner tube 131 is smaller than the inner diameter $d_0$ of the bellows pipe 130. Therefore, the inner tube 131 can be inserted into the bellows pipe 130. Further, a length $L_i$ of the inner tube 131 in the lengthwise direction is shorter than a length $L_O$ of the bellows pipe 130 in the lengthwise direction, as depicted in FIG. 2, for example. Thus, there is a gap between the inner tube 131 and the caps 133 connected to the ends of the bellows pipe 130.

When the fluid flows within the flexible pipe 13, a part of the fluid is introduced into a space between the bellows pipe 130 and the inner tube 131 through the gap between the caps 133 and the inner tube 131. Accordingly, a difference between a pressure of the fluid applied to an inner side of the inner tube 131 and a pressure of the fluid applied to an outer side of the inner tube 131 is small. Thus, the inner tube 131 may not be easily deformed by the pressure of the fluid, and, therefore, a material having a mechanical strength which is not that high may be used to form the inner tube 131. Air tightness and liquid tightness for the fluid flowing in the flexible pipe 13 is secured by the bellows pipe 130 and the caps 133.

Figure 3:
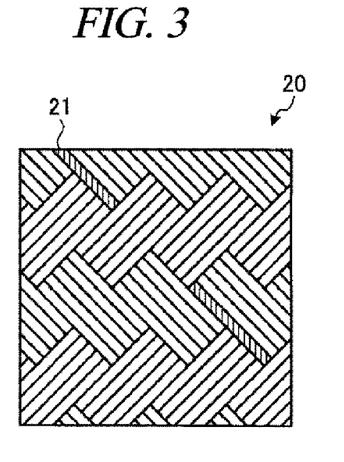
FIG. 3 is a diagram illustrating an example of a surface of a braided body.

An inner surface 132 of the inner tube 131 where the fluid flows is smoother than a surface of a tube composed of a braided body 20. To elaborate, the inner surface 132 of the inner tube 131 has a surface roughness Ra equal to or less than 0.045 mm. Here, the braided body 20 is composed of a multiple number of alternately woven strands 21, as shown in FIG. 3, for example. Each strand 21 is made of, by way of non-limiting example, carbon, a metal, alumina or the like, and has a diameter of, e.g., several hundreds of micrometers (μm).

Here, a pressure loss ΔP of the fluid when the fluid is flown into a pipe at a preset pressure may be indicated by the following expression (1), for example.

$$\Delta P = \lambda \cdot (L/d) \cdot (\rho \cdot v^2)/2 \quad (1)$$

In the expression (1), λ denotes a pipe friction coefficient between the fluid and a surface of a pipe in contact with the fluid; L, a length of the pipe; d, an inner diameter of the pipe; ρ, a density of the fluid flowing in the pipe; and v, a flow velocity of the fluid. Since the fluid needs to be flown at a discharge pressure which is set in consideration of the pressure loss ΔP, energy consumption of the chiller unit 15 is increased with a rise of the pressure loss ΔP of the fluid. To diminish the energy consumption of the chiller unit 15, the pressure loss ΔP of the fluid needs to be reduced.

In case of installing the pipe, there is a limit in an available maximum value of the inner diameter d of the pipe. Further, to maintain cooling capacity by the chiller unit 15, it is difficult to reduce the flow velocity v of the fluid. Furthermore, if an installation place for the processing chamber 10 and an installation place for the chiller unit 15 are once decided, there is a limit in shortening the length L of the pipe. In view of this, to reduce the pressure loss ΔP of the fluid, it is important how to reduce the pipe friction coefficient λ between the fluid and the surface of the pipe in contact with the fluid.

In the present exemplary embodiment, the inner surface 132 of the inner tube 131 where the fluid flows is smoother than the surface of the tube composed of the braided body 20. Therefore, the flexible pipe 13 according to the present exemplary embodiment is capable of reducing the pipe friction coefficient λ between the fluid and the surface 132 of the inner tube 131 in contact with the fluid, as compared to a conventional pipe in which a tube made of the braided body 20 is placed at the inner side of the bellows pipe 130. Accordingly, in the flexible pipe 13 of the present exemplary embodiment, the pressure loss ΔP of the fluid can be suppressed to be low. Therefore, the energy consumption of the chiller unit 15 can be reduced.

Further, in the aforementioned expression (1), the flow velocity v of the fluid is represented by the following expression (2) by using a flow rate U of the fluid and a cross sectional area A of the pipe.

$$v = U/A = (4U)/(\pi d^2) \quad (2)$$

In the expression (2), d denotes the diameter of the pipe.

If the expression (2) is put into the expression (1), the pressure loss ΔP of the fluid is indicated by the following expression (3), for example.

$$\Delta P = (8\lambda L\rho U^2)/(\pi^2 d^5) \quad (3)$$

From the expression (3), when the inner diameter $d_O$ of the bellows pipe 130, the pipe friction coefficient $\lambda_O$ of the bellows pipe 130, the inner diameter $d_i$ of the inner tube 131 and the pipe friction coefficient $\lambda_i$ of the inner tube 131 satisfy a relationship indicated by the following expression (4), the pressure loss ΔP of the fluid can be reduced.

$$(\lambda_O/\lambda_i) > (d_O/d_i)^5 \quad (4)$$

In the inner tube 131 according to the present exemplary embodiment, the inner surface 132 is formed to be smooth with the surface roughness Ra equal to or less than, e.g., 0.045 mm. Therefore, the expression (4) can be satisfied, so that the pressure loss ΔP of the fluid can be reduced.

Second Exemplary Embodiment

In the first exemplary embodiment, the inner tube 131 is made of the insulating material such as PFA or PTFE, and the fluid flowing in the inner tube 131 is the insulating fluid such as, but not limited to, Freon. Accordingly, static electricity generated by friction between the fluid and the inner surface 132 of the inner tube 131 is charged on the inner tube 131. If a voltage of the static electricity charged on the inner tube 131 exceeds a certain value, electric discharge takes place, so that the inner tube 131 may be damaged.

Figure 4:
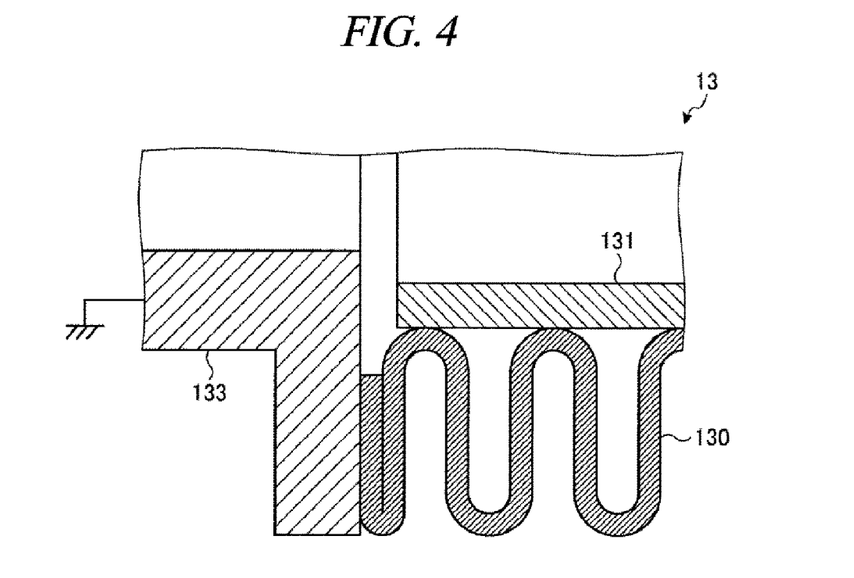
FIG. 4 is an enlarged cross sectional view illustrating an example of a flexible pipe according to a second exemplary embodiment.

To avoid this problem, in the second exemplary embodiment, an inner tube 131 is made of a material prepared by adding a conductive material to the insulating material such as PFA or PTFE. The conductive material added to the insulating material such as PFA or PTFE may be, by way of example, but not limitation, carbon or a metal. Therefore, the inner tube 131 according to the present exemplary embodiment has conductivity.

Further, in the present exemplary embodiment, an outer diameter of the inner tube 131 is smaller than an inner diameter $d_O$ of a bellows pipe 130, as in the inner tube 131 of the first exemplary embodiment described in FIG. 2, for example. Further, a length $L_i$ of the inner tube 131 in the lengthwise direction is shorter than a length $L_O$ of the bellows pipe 130 in the lengthwise direction, as in the inner tube 131 of the first exemplary embodiment described in FIG. 2, for example. Further, the inner tube 131 is not fixed to the bellows pipe 130 and caps 133. Therefore, the inner tube 131 can be moved within the bellows pipe 130 in the lengthwise direction of the bellows pipe 130 and the direction intersecting with this lengthwise direction.

In this configuration, at least a part of an outer surface of the inner tube 131 comes into contact with the bellows pipe 130 to be electrically connected with the bellows pipe 130, as shown in FIG. 4. FIG. 4 is an enlarged cross sectional view illustrating an example of a flexible pipe 13 according to the second exemplary embodiment. Accordingly, static electricity generated by friction between the fluid and an inner surface 132 of the inner tube 131 flows within the inner tube 131 and then flows into the bellows pipe 130 from the outer surface of the inner tube 131 which is in contact with the bellows pipe 130. Since the bellows pipe 130 is grounded via the caps 133, the static electricity introduced into the bellows pipe 130 from the inner tube 131 is flown to the ground.

Accordingly, the flexible pipe 13 according to the second exemplary embodiment is capable of suppressing an increase of a voltage of the static electricity charged in the inner tube 131, so that a damage upon the inner tube 131 due to electric discharge can be suppressed.

Third Exemplary Embodiment

Figure 5:
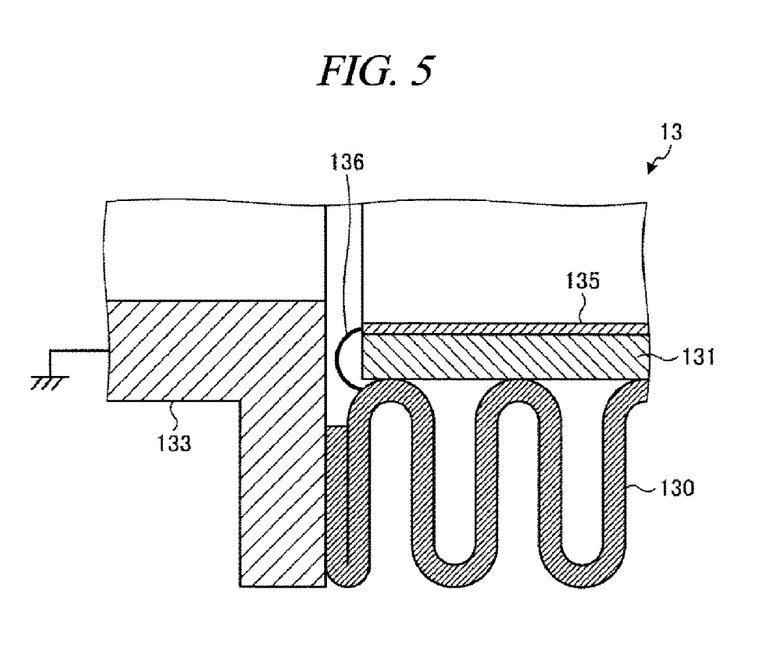
FIG. 5 is an enlarged cross sectional view illustrating an example of a flexible pipe according to a third exemplary embodiment.

In the second exemplary embodiment, the entire inner tube 131 is formed of the conductive material. The third exemplary embodiment is different from the second exemplary embodiment in that an inner side of an inner tube 131 in which the fluid flows is coated with a conductive material.

FIG. 5 is an enlarged cross sectional view illustrating an example of a flexible pipe 13 according to the third exemplary embodiment. In the present exemplary embodiment, the inner side of an inner tube 131 is coated with a conductive film 135 including the conductive material, as illustrated in FIG. 5, for example. A surface of the conductive film 135 which comes into contact with the fluid flowing in the inner tube 131 is smoother than the surface of the tube composed of the braided body 20. To elaborate, the surface roughness Ra of the conductive film 135 which comes into contact with the fluid flowing in the inner tube 131 is equal to or less than 0.045 mm.

Further, the conductive film 135 coated at the inner side of the inner tube 131 is connected to a bellows pipe 130 via a wiring 136. Accordingly, static electricity generated by friction between the fluid and the conductive film 135 flows on the conductive film 135 and then flows into the bellows pipe 130 via the wiring 136. Since the bellows pipe 130 is grounded via caps 133, the static electricity introduced into the bellows pipe 130 then flows to the ground. Furthermore, since the conductive film 135 coated at the inner side of the inner tube 131 may be connected to the caps 133 via the wiring 136.

With this configuration, the flexible pipe 13 according to the present exemplary embodiment is capable of suppressing an increase of the static electricity which is charged in the inner tube 131 by the fluid flowing in the inner tube 131. Therefore, a damage on the inner tube 131 due to electric discharge can be suppressed.

Fourth Exemplary Embodiment

Figure 6:
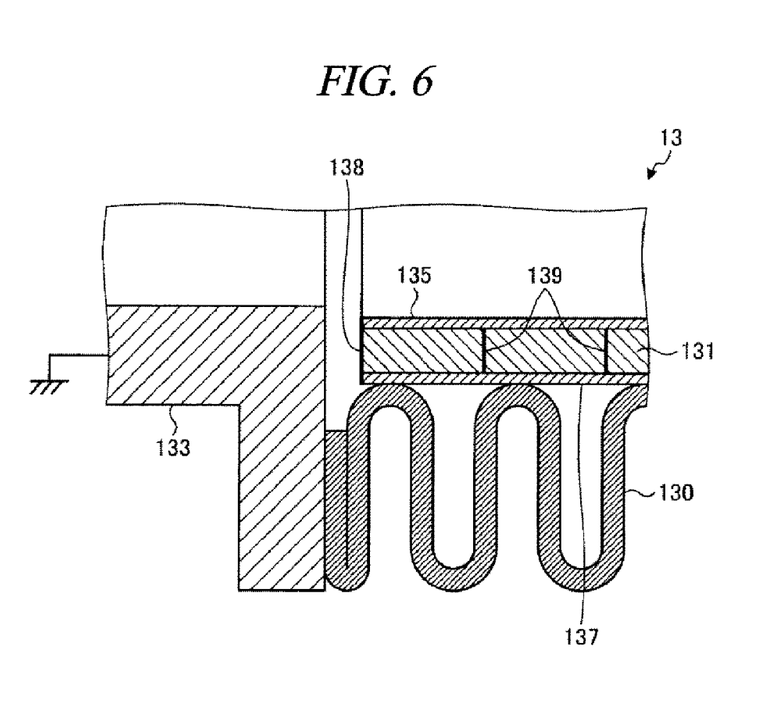
FIG. 6 is an enlarged cross sectional view illustrating an example of a flexible pipe according to a fourth exemplary embodiment.

In the third exemplary embodiment, the conductive film 135 coated at the inner side of the inner tube 131 is connected to the bellows pipe 130 via the wiring 136. In the fourth exemplary embodiment, however, a conductive film 135 coated at an inner side of an inner tube 131 is connected via a wiring 138 to a conductive film 137 coated at an outer side of the inner tube 131, as shown in FIG. 6, for example. FIG. 6 is an enlarged cross sectional view illustrating an example of a flexible pipe 13 according to the fourth exemplary embodiment. As the conductive film 137 is in contact with a bellows pipe 130, the conductive film 137 is conducted with the bellows pipe 130 as well.

With this configuration, even when the inner tube 131 is moved within the bellows pipe 130, the wiring 138 is moved within the bellows pipe 130 as one body with the inner tube 131. Therefore, the wiring 138 may not be cut. Hence, static electricity generated by friction between the fluid and the conductive film 135 can be discharged out to the ground more securely via the bellows pipe 130.

Furthermore, the conductive film 135 coated at the inner side of the inner tube 131 and the conductive film 137 coated at the outer side of the inner tube 131 may also be connected via a wiring 139 configured to penetrate the inner tube 131 in the thickness direction, as shown in FIG. 6, as well as being connected via the wiring 138 provided at an end surface of the inner tube 131. With this configuration, even if the end surface of the inner tube 131 and a cap 133 are rubbed with each other, the wiring connecting the conductive film 135 and the conductive film 137 may not be peeled off, and the conductive film 135 and the conductive film 137 can be connected more securely.

Figure 7:
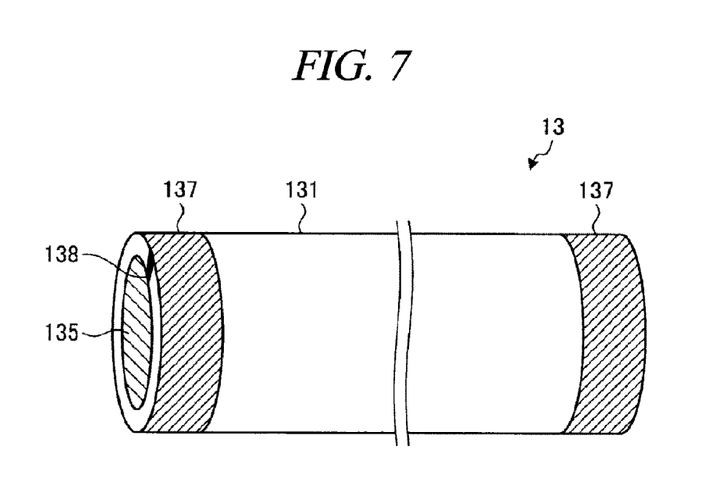
FIG. 7 is a diagram illustrating an example of a coating range of an outer surface of an inner tube.

In addition, the conductive film 137 may be provided on the entire outer surface of the inner tube 131, or may be provided at a part of the outer surface of the inner tube 131 in the lengthwise direction, as shown in FIG. 7, for example. In the example of FIG. 7, the conductive film 137 is provided at a part of the inner tube 131 in the lengthwise direction to be coated along the entire circumference of the outer surface of the inner tube 131. With this configuration, the amount of the conductive film 137 provided at the outer side of the inner tube 131 can be reduced. Further, in the example of FIG. 7, the single wiring 138 is provided at the end surface of the inner tube 131 to connect the conductive film 135 and the conductive film 137. As another example, however, a plurality of wirings 138 may be provided at the end surface of the inner tube 131 to connect the conductive film 135 and the conductive film 137.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting. The scope of the inventive concept is defined by the following claims and their equivalents rather than by the detailed description of the exemplary embodiments. It shall be understood that all modifications and embodiments conceived from the meaning and scope of the claims and their equivalents are included in the scope of the inventive concept.

We claim:

1. A flexible pipe, comprising:
a bellows pipe made of a metal; and
a flexible tube provided at an inner side of the bellows pipe,
wherein an inner surface of the flexible tube where a fluid flows is smooth, and
a surface roughness Ra of the inner surface of the flexible tube is equal to or less than 0.045 mm,
wherein an inner diameter $d_o$ of the bellows pipe, a pipe friction coefficient $\lambda_o$ of the bellows pipe, an inner diameter $d_i$ of the flexible tube and a pipe friction coefficient $\lambda_i$ of the flexible tube satisfy a following relationship:

$$(\lambda_o/\lambda_i) > (d_o/d_i)^5.$$

2. The flexible pipe of claim 1,
wherein the inner surface of the flexible tube is smoother than a surface of a braided body.
3. The flexible pipe of claim 1,
wherein the flexible tube is made of PFA (tetrafluoroethylene perfluoroalkyl vinylether copolymer) or PTFE (polytetrafluoroethylene).
4. The flexible pipe of claim 1,
wherein at least a part of an inner side of the flexible tube is coated with a first conductive material, and
a coating at the inner side of the flexible tube is connected to the bellows pipe.
5. The flexible pipe of claim 4,
wherein at least a part of an outer side of the flexible tube is coated with a second conductive material,
the coating at the outer side of the flexible tube is connected to the coating at the inner side of the flexible tube, and
at least a part of the coating at the outer side of the flexible tube is conducted with the bellows pipe.
6. The flexible pipe of claim 4,
wherein the first conductive material is a conductive film to which carbon or a metal powder is added.
7. The flexible pipe of claim 1,
wherein the flexible tube is made of a conductive material, and
at least a part of an outer side of the flexible pipe is conducted with the bellows pipe.
8. The flexible pipe of claim 7,
wherein the flexible tube is made of a material containing PFA (tetrafluoroethylene perfluoroalkyl vinylether copolymer) or PTFE (polytetrafluoroethylene) to which carbon or a metal powder is added.
9. The flexible pipe of claim 1,
wherein an outer diameter of the flexible tube is shorter than the inner diameter of the bellows pipe, and
a length of the flexible pipe in a lengthwise direction thereof is shorter than a length of the bellows pipe in a lengthwise direction thereof.
10. A temperature control system, comprising:
a heat exchange member configured to perform a heat exchange with respect to a temperature control target object;
a supply device configured to supply a temperature-controlled fluid to the heat exchange member; and
a flexible pipe forming at least a part of a path of the fluid between the heat exchange member and the supply device,
wherein the flexible pipe comprises:
a bellows pipe made of a metal; and
a flexible tube provided at an inner side of the bellows pipe, and
wherein an inner surface of the flexible tube where a fluid flow is smooth, and
a surface roughness Ra of the inner surface of the flexible tube is equal to or less than 0.045 mm,
wherein an inner diameter $d_o$ of the bellows pipe, a pipe friction coefficient $\lambda_o$ of the bellows pipe, an inner diameter $d_i$ of the flexible tube and a pipe friction coefficient $\lambda_i$ of the flexible tube satisfy a following relationship:

$$(\lambda_o/\lambda_i) > (d_o/d_i)^5.$$

11. A flexible pipe, comprising:
a bellows pipe made of a metal; and
a flexible tube provided at an inner side of the bellows pipe, wherein an inner surface of the flexible tube where a fluid flows is smooth, at least a part of an inner side of the flexible tube is coated with a conductive material, and a coating at the inner side of the flexible tube is connected to the bellows pipe.

12. A flexible pipe, comprising:

a bellows pipe made of a metal; and a flexible tube provided at an inner side of the bellows pipe, wherein an inner surface of the flexible tube where a fluid flows is smooth, the flexible tube is made of a conductive material, and at least a part of an outer side of the flexible pipe is conducted with the bellows pipe.

13. A temperature control system, comprising:

a heat exchange member configured to perform a heat exchange with respect to a temperature control target object;

a supply device configured to supply a temperature-controlled fluid to the heat exchange member; and a flexible pipe forming at least a part of a path of the fluid between the heat exchange member and the supply device, wherein the flexible pipe comprises:

a bellows pipe made of a metal; and a flexible tube provided at an inner side of the bellows pipe, and wherein an inner surface of the flexible tube where a fluid flow is smooth, at least a part of an inner side of the flexible tube is coated with a conductive material, and a coating at the inner side of the flexible tube is connected to the bellows pipe.

14. A temperature control system, comprising:

a heat exchange member configured to perform a heat exchange with respect to a temperature control target object;

a supply device configured to supply a temperature-controlled fluid to the heat exchange member; and a flexible pipe forming at least a part of a path of the fluid between the heat exchange member and the supply device, wherein the flexible pipe comprises:

a bellows pipe made of a metal; and a flexible tube provided at an inner side of the bellows pipe, and wherein an inner surface of the flexible tube where a fluid flows is smooth, the flexible tube is made of a conductive material, and at least a part of an outer side of the flexible pipe is conducted with the bellows pipe.

* * * * *